United States Patent
Ida (10) Patent No.: US 8,302,023 B2
(45) Date of Patent: Oct. 30, 2012

(54) CHARACTER INPUT DEVICE AND CHARACTER INPUT METHOD

(75) Inventor: Tomotaka Ida, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 50 days.

(21) Appl. No.: 12/895,450

(22) Filed: Sep. 30, 2010

(65) Prior Publication Data

US 2011/0163962 A1     Jul. 7, 2011

(30) Foreign Application Priority Data

Jan. 6, 2010  (JP) ................................ 2010-001501

(51) Int. Cl.
*G06F 3/048* (2006.01)
*G06F 3/00* (2006.01)
*G06F 3/02* (2006.01)
*H04N 5/44* (2011.01)

(52) U.S. Cl. ........ 715/773; 715/710; 715/780; 715/835; 345/169; 348/734

(58) Field of Classification Search .................. 715/773, 715/780, 835, 708, 710; 345/169, 161; 348/14.05, 348/734
See application file for complete search history.

(56) References Cited

U.S. PATENT DOCUMENTS

| | | | |
|---|---|---|---|
| 5,452,439 A * | 9/1995 | Makino | 715/710 |
| 5,543,818 A * | 8/1996 | Scott | 345/168 |
| 5,790,115 A * | 8/1998 | Pleyer et al. | 715/716 |
| 6,144,378 A * | 11/2000 | Lee | 715/767 |
| 6,232,969 B1 * | 5/2001 | Fawcett | 345/467 |
| 6,243,741 B1 * | 6/2001 | Utsumi | 709/208 |
| 6,486,870 B1 * | 11/2002 | Kozu | 345/157 |
| 7,088,341 B2 * | 8/2006 | Koch et al. | 345/169 |
| 7,171,498 B2 * | 1/2007 | Tu et al. | 710/73 |
| 7,218,249 B2 * | 5/2007 | Chadha | 341/23 |
| 7,240,293 B2 * | 7/2007 | Lungwitz et al. | 715/780 |
| 7,583,206 B2 | 9/2009 | Völckers | |
| 7,715,882 B2 * | 5/2010 | Oda et al. | 455/566 |
| 2002/0089435 A1 | 7/2002 | Hanamoto et al. | |
| 2002/0093535 A1 * | 7/2002 | Murphy | 345/764 |
| 2002/0156615 A1 * | 10/2002 | Takatsuka et al. | 704/1 |
| 2002/0175944 A1 * | 11/2002 | Kolde et al. | 345/773 |

(Continued)

FOREIGN PATENT DOCUMENTS

| | | |
|---|---|---|
| EP | 1 677 176 | 7/2006 |
| JP | 10-224701 A | 8/1998 |
| JP | 2000-148366 A | 5/2000 |
| JP | 2002-132429 | 5/2002 |

(Continued)

OTHER PUBLICATIONS

Notice of Reasons for Rejection mailed by the Japan Patent Office on Mar. 8, 2011 in corresponding Japanese application No. 2010-001501 in 7 pages.

*Primary Examiner* — Tadeese Hailu
*Assistant Examiner* — Nicholas Ulrich
(74) *Attorney, Agent, or Firm* — Knobbe, Martens, Olson & Bear LLP (57) ABSTRACT

According to one embodiment, a character input device is configured as follows. Based on a key operation on a remote controller, any of alphabetic characters displayed on a screen is selected and input. A plurality of graphemes present for the alphabetic character selected based on the key operation on the remote controller are displayed on the screen. Any of the plurality of graphemes displayed on the screen is selected and input.

4 Claims, 10 Drawing Sheets

U.S. PATENT DOCUMENTS

| | | | |
|---|---|---|---|
| 2005/0017952 A1* | 1/2005 | Hsi | 345/169 |
| 2007/0209016 A1* | 9/2007 | Takayama et al. | 715/780 |
| 2008/0047814 A1* | 2/2008 | Crohas et al. | 200/5 A |
| 2008/0117171 A1* | 5/2008 | Kwak | 345/168 |
| 2009/0058823 A1 | 3/2009 | Kocienda | |
| 2009/0213079 A1* | 8/2009 | Segal et al. | 345/169 |
| 2010/0017711 A1* | 1/2010 | Aso et al. | 715/708 |

FOREIGN PATENT DOCUMENTS

| | | |
|---|---|---|
| JP | 2005-020460 | 1/2005 |
| JP | 2006-186886 | 7/2006 |
| JP | 4181999 | 9/2008 |
| JP | 2008-241590 | 10/2008 |
| WO | WO2003/067409 | 8/2003 |
| WO | WO 2009/032483 | 3/2009 |

\* cited by examiner

Manual setting item selection

| Name on network | | | |
|---|---|---|---|
| Identification number | | | |
| ⋮ | ⋮ | | |
| ⋮ | ⋮ | | |

Press cursor up or down key to select. Press enter key to confirm. Press back key to return to previous screen

FIG. 3

Character input (name on network)

| a | b | c | d | e | f | g | h | i | j | k |
|---|---|---|---|---|---|---|---|---|---|---|

33a

| A | B | C | D | E | F | G | H | I | J | K |
|---|---|---|---|---|---|---|---|---|---|---|
| L | M | N | O | P | Q | R | S | T | U | V |
| W | X | Y | Z | | | | | | | |

33b

Press numeric key to input number. Press cursor up, down, right, or left key to select. Press enter key to confirm.
Press red key to remove. Press green key to switch mode. Press yellow mode to select discriminatory phonetic symbol.
Press back key to return to previous screen

FIG. 4

|     | a |   |   |   |   |   |   |   |   |   |   |
| --- | - | - | - | - | - | - | - | - | - | - | - |
| (a) 33a | 0 |   |   |   |   |   |   |   |   |   |   |

|     | a | b |   |   |   |   |   |   |   |   |   |
| --- | - | - | - | - | - | - | - | - | - | - | - |
| (b) | 0 | 1 |   |   |   |   |   |   |   |   |   |

|     | a | b | c |   |   |   |   |   |   |   |   |
| --- | - | - | - | - | - | - | - | - | - | - | - |
| (c) | 0 | 1 | 2 |   |   |   |   |   |   |   |   |

|     | a | b | c | d |   |   |   |   |   |   |   |
| --- | - | - | - | - | - | - | - | - | - | - | - |
| (d) | 0 | 1 | 2 | 3 |   |   |   |   |   |   |   |

|     | a | b | c | d | e |   |   |   |   |   |   |
| --- | - | - | - | - | - | - | - | - | - | - | - |
| (e) | 0 | 1 | 2 | 3 | A |   |   |   |   |   |   |

|     | a | b | c | d | e |   |   |   |   |   |   |
| --- | - | - | - | - | - | - | - | - | - | - | - |
| (f) | 0 | 1 | 2 | 3 | a |   |   |   |   |   |   |

|     | a | b | c | d | e | f |   |   |   |   |   |
| --- | - | - | - | - | - | - | - | - | - | - | - |
| (g) | 0 | 1 | 2 | 3 | a | B |   |   |   |   |   |

|     | a | b | c | d | e | f |   |   |   |   |   |
| --- | - | - | - | - | - | - | - | - | - | - | - |
| (h) | 0 | 1 | 2 | 3 | a | b |   |   |   |   |   |

|     | a | b | c | d | e | f | g |   |   |   |   |
| --- | - | - | - | - | - | - | - | - | - | - | - |
| (i) | 0 | 1 | 2 | 3 | a | b | C |   |   |   |   |

|     | a | b | c | d | e | f | g |   |   |   |   |
| --- | - | - | - | - | - | - | - | - | - | - | - |
| (j) | 0 | 1 | 2 | 3 | a | b | c |   |   |   |   |

FIG. 5

Manual setting item selection

| Name on network | 0123abc |
|---|---|
| Identification number | |
| ⋮ | ⋮ |
| ⋮ | ⋮ |

Press cursor up or down key to select. Press enter key to confirm. Press back key to return to previous screen

F I G. 6

|   | a | b | c | d | e |   |   |   |   |   |
|---|---|---|---|---|---|---|---|---|---|---|
(a) 33a | 0 | 1 | 2 | 3 | A |   |   |   |   |   |

|   | a | b | c | d | e |   |   |   |   |   |
|---|---|---|---|---|---|---|---|---|---|---|
(b) | 0 | 1 | 2 | 3 | À |   |   |   |   |   |

|   | a | b | c | d | e |   |   |   |   |   |
|---|---|---|---|---|---|---|---|---|---|---|
(c) | 0 | 1 | 2 | 3 | Á |   |   |   |   |   |

|   | a | b | c | d | e |   |   |   |   |   |
|---|---|---|---|---|---|---|---|---|---|---|
(d) | 0 | 1 | 2 | 3 | Â |   |   |   |   |   |

|   | a | b | c | d | e |   |   |   |   |   |
|---|---|---|---|---|---|---|---|---|---|---|
(e) | 0 | 1 | 2 | 3 | Ã |   |   |   |   |   |

|   | a | b | c | d | e |   |   |   |   |   |
|---|---|---|---|---|---|---|---|---|---|---|
(f) | 0 | 1 | 2 | 3 | Ä |   |   |   |   |   |

|   | a | b | c | d | e |   |   |   |   |   |
|---|---|---|---|---|---|---|---|---|---|---|
(g) | 0 | 1 | 2 | 3 | Å |   |   |   |   |   |

|   | a | b | c | d | e |   |   |   |   |   |
|---|---|---|---|---|---|---|---|---|---|---|
(h) | 0 | 1 | 2 | 3 | Æ |   |   |   |   |   |

F I G. 7

Character input (name on network)

| a | b | c | d | e | f | g | h | i | j | k |
|---|---|---|---|---|---|---|---|---|---|---|
| 0 | 1 | 2 | 3 | a | B |   |   |   |   |   |

| A | B | C | D | E | F | G | H | I | J | K |
|---|---|---|---|---|---|---|---|---|---|---|
| L | M | N | O | P | Q | R | S | T | U | V |
| W | X | Y | Z |   |   |   |   |   |   |   |

Press numeric key to input number. Press cursor up, down, right, or left key to select. Press enter key to confirm.
Press red key to remove. Press green key to switch mode. Press back key to return to previous screen

F I G. 8

Character input (name on network)

| a | b | c | d | e | f | g | h | i | j | k |
|---|---|---|---|---|---|---|---|---|---|---|
| 0 | 1 | 2 | 3 | a | B |   |   |   |   |   |

33a

| A | B | C | D | E | F | G | H | I | J | K |
|---|---|---|---|---|---|---|---|---|---|---|
| L | M | N | O | P | Q | R | S | T | U | V |
| W | X | Y | Z |   |   |   |   |   |   |   |

33b

Input character B has no discriminatory phonetic symbol

Press numeric key to input number. Press cursor up, down, right, or left key to select. Press enter key to confirm.
Press red key to remove. Press green key to switch mode. Press back key to return to previous screen

FIG. 9

Character input (name on network)

| a | b | c | d | e | f | g | h | i | j | k |
|---|---|---|---|---|---|---|---|---|---|---|
| 0 | 1 | 2 | 3 | A |   |   |   |   |   |   |

33a

| A | À | Á | Â | Ã | Ä | Å | Æ |
|---|---|---|---|---|---|---|---|

33d

Press numeric key to input number. Press cursor up, down, right, or left key to select. Press enter key to confirm.
Press red key to remove. Press green key to switch mode. Press back key to return to previous screen

FIG. 10

CHARACTER INPUT DEVICE AND CHARACTER INPUT METHOD

CROSS-REFERENCE TO RELATED APPLICATIONS

This application is based upon and claims the benefit of priority from Japanese Patent Application No. 2010-001501, filed Jan. 6, 2010; the entire contents of which are incorporated herein by reference.

FIELD

Embodiments described herein relate generally to a character input device and a character input method in which inputting of Roman alphabetic characters is improved.

BACKGROUND

As is well known, in recent years, digitalization of television broadcasting has been being promoted. For example, in Japan, not only broadcasting satellite (BS) digital broadcasting and 110-degree communication satellite (CS) digital broadcasting but also terrestrial digital broadcasting has been put to practical use.

Thus, television broadcasting reception apparatuses configured to receive such digital television broadcasting provide a function to selectively receive not only the current terrestrial analog broadcasting but also satellite digital broadcasting, and terrestrial digital broadcasting, and the like. Furthermore, these digital television broadcasting reception apparatuses also provide a network connection function.

The network connection function allows the digital television broadcasting reception apparatus to form a home network together with personal computer (PC) or a recording and reproduction apparatus. Then, based on control performed by PC, the digital television broadcasting reception apparatus can record received contents in the recording and reproduction apparatus and acquire contents from the recording and reproduction apparatus for reproduction.

Moreover, the digital television broadcasting reception apparatus with the network connection function includes a software keyboard function. The software keyboard function is such that a keyboard is displayed on a display screen so that on the displayed keyboard, characters can be input using a remote controller.

Such a software keyboard function provided in the digital television broadcasting reception apparatus provides a user with operation means other than a PC keyboard which allows characters to be input. Furthermore, the software keyboard function enables character input to be carried out on the normally viewed display screen, making the input operation more convenient.

However, such a software keyboard function is still in a development stage, and there is much room for development of the details of the function. In particular, with respect to an operation of inputting graphemes for Roman alphabetic characters, there has been almost no development for improvement of the convenience.

Japanese Patent No. 4181999 discloses a device for electronic apparatuses which is configured to allow texts to be input by operating keys in a numeric key block. In this device, operating an Alt key in the numeric key block allows a list of special characters (graphemes) to be shown on the display so that any desired character can be selected from the list and input.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings. In general, according to one embodiment, a character input device is configured as follows. Based on a key operation on a remote controller, any of alphabetic characters displayed on a screen is selected and input. A plurality of graphemes present for the alphabetic character selected based on the key operation on the remote controller are displayed on the screen. Any of the plurality of graphemes displayed on the screen is selected and input.

Figure 1:
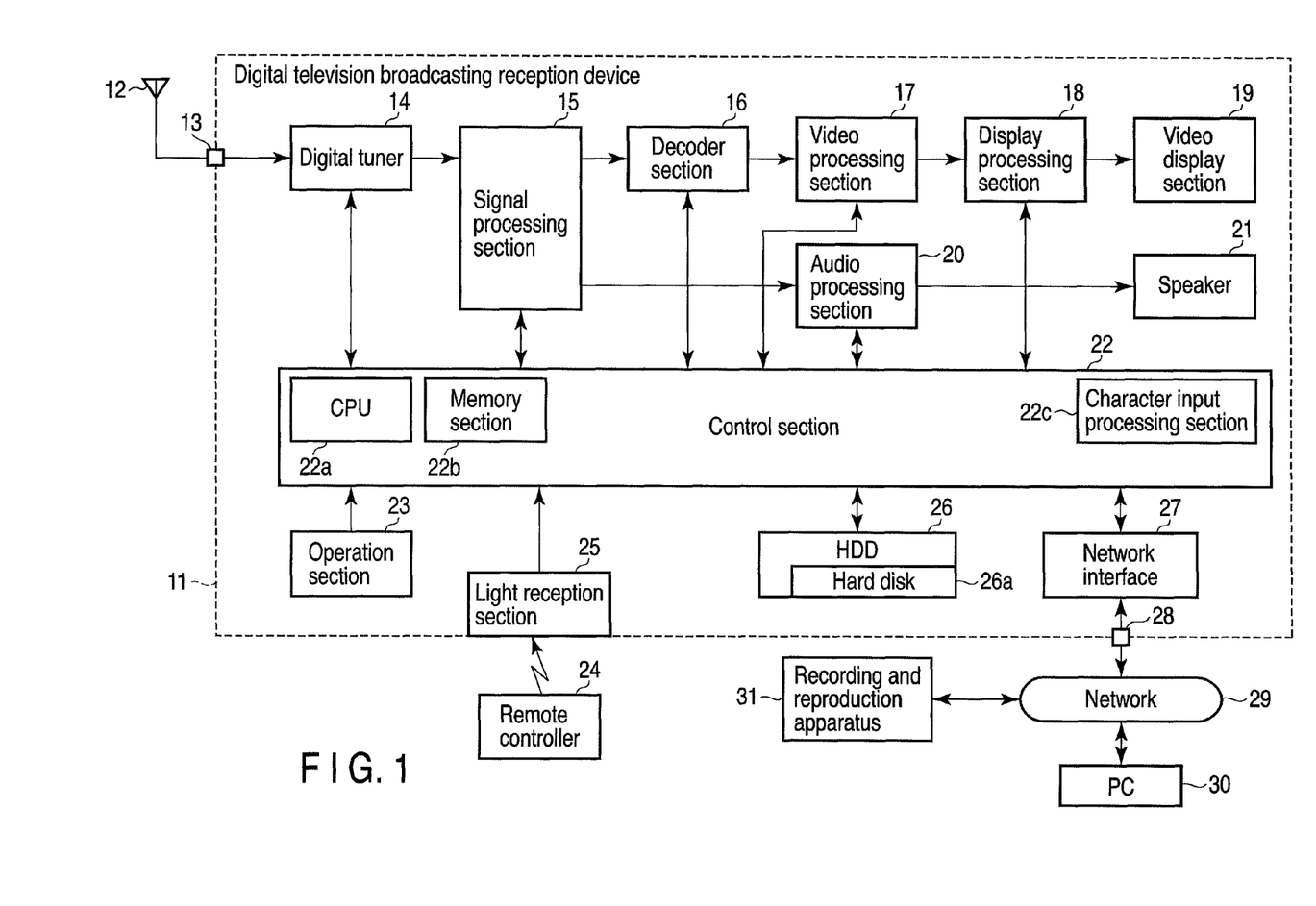
FIG. 1 is a block diagram illustrating an example of general configuration of a digital television broadcasting reception device according to an embodiment.

FIG. 1 schematically shows a digital television broadcasting reception device 11 described in the embodiment. That is, digital broadcasting signals received by an antenna 12 are supplied to a digital tuner 14 via an input terminal 13 so that a digital broadcasting signal for a desired channel can be turned in.

The digital broadcasting signal tuned in by the digital tuner 14 is supplied to a signal processing section 15, which then demodulates and separates the digital broadcasting signal into a video signal and an audio signal. The video signal is supplied to a decoder section 16, which then executes a decode process on the video signal. The processed video signal is supplied to a video processing section 17, which then executes a predetermined digital signal process such as screen size adjustment on the signal.

The video signal output by the video processing section 17 is supplied to a display processing section 18, which then superimposes character information or graphic information such as an on-screen display (OSD) signal on the video signal. Thereafter, the video signal on which the graphic information is superimposed by the display processing section 18 is supplied to a video supply section 19, which then displays the corresponding video.

Furthermore, the audio signal separated by the signal processing section 15 is supplied to an audio processing section 20. The audio processing section 20 executes a predetermined audio signal process on the audio signal and then amplifies the signal. The audio signal output by the audio processing section 20 is supplied to a speaker 21, which then reproduces the corresponding sound.

Here, all the operations of the digital television broadcasting reception device 11 including the above-described reception operation are integrally controlled by a control section 22. The control section 22 contains a central processing unit (CPU) 22a. The control section 22 receives operation information obtained from an operation section 23 installed on the main body of the digital television broadcasting reception device 11 or operation information transmitted via a remote controller 24 and received by a light reception section 25. The control section 22 then controls each of the above-described sections so as to reflect the contents of the operations.

In this case, the control section 22 mainly utilizes a memory section 22b. The memory section 22b comprises a read-only memory (ROM) configured to store control programs executed by a CPU 22a, a random access memory (RAM) configured to provide a work area for CPU 22a, and a nonvolatile memory configured to store various pieces of setting information and control information.

Furthermore, a hard disk drive (HDD) 26 is connected to the control section 22. Based on the user's operation of the operation section 23 or the remote controller 24, the control section 22 controllably supplies the HDD 26 with the video signal obtained from the decoder section 16 and the audio signal obtained from the audio processing section 20 and allows the signals to be recorded in a hard disk 26a.

Moreover, based on the user's operation of the operation section 23 or the remote controller 24, the control section 22 controllably allows HDD 26 to read the video signal and audio signal from the hard disk 26a and supplies the read video and audio signals to the decoder section 16 and the audio processing section 20, respectively. Then, the decoder section 16 displays the corresponding video, and the audio processing section 20 reproduces the corresponding sound.

Furthermore, a network interface 27 is connected to the control section 22. The network interface 27 is connected to an external network 29 via an I/O terminal 28. PC 30 serving as a network controller and a recording and reproduction apparatus 31, for example, HDD, are connected to the network 29.

Thus, the control section 22 can access PC 30 or recording and reproduction apparatus 31 via the network interface 27, the I/O terminal 28, and the network 29 to transmit information. Hence, based on control performed by PC 30, the control section 22 can receive contents and allow the contents to be recorded in the recording and reproduction apparatus 31.

Furthermore, based on control performed by PC 30, the control section 22 can read a predetermined content to display the corresponding video while reproducing the corresponding sound. Moreover, based on control performed by PC 30, the control section 22 can record any of the contents recorded in HDD 26, in the recording and reproduction apparatus 31 and record any of the contents recorded in recording and reproduction apparatus 31, in HDD 26.

Moreover, the control section 22 comprises a character input processing section 22c. The character input processing section 22c implements the software keyboard function. That is, the character input processing section 22c allows a keyboard to be displayed on a screen of the video display section 19 to control a process in which the user operates the remote controller 24 to select any of predetermined characters on the keyboard displayed on the screen and input the selected character.

In this case, although described below in detail, in particular, the character input processing section 22c performs control such that the user can easily input graphemes in Roman alphabetic characters, for example, in connection with "A", À, Á, Â, Ã, Ä, Å, Æ

Figure 2:
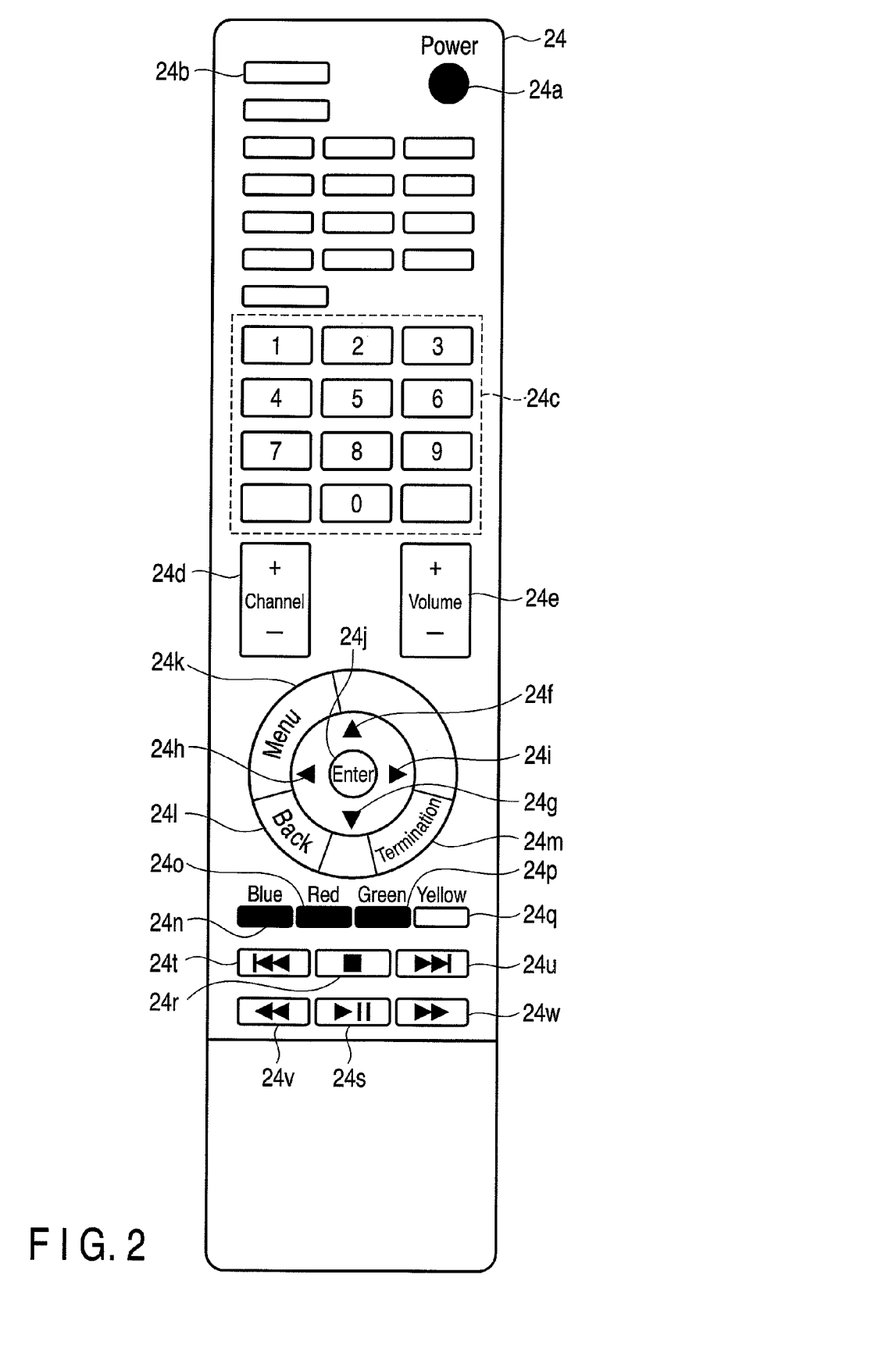
FIG. 2 is a diagram illustrating an example of appearance of a remote controller for the digital television broadcasting reception device according to the embodiment.

FIG. 2 shows the appearance of the remote controller 24. The remote controller 24 mainly comprises a power supply key 24a, an input switching key 24b, numeric keys 24c, a channel up/down key 24d, a volume adjustment key 24e, a cursor up key 24f, a cursor down key 24g, a cursor left key 24h, a cursor right key 24i, an enter key 24j, a menu key 24k, a back key 24l, a termination 24m, a blue key 24n, a red key 24o, a green key 24p, and a yellow key 24q.

The remote controller 24 further comprises a play stop key 24r, a play/pause key 24s, a backward skip key 24t, a forward skip key 24u, a fast backward key 24v, and a fast forward key 24w.

That is, the play stop key 24r and play/pause key 24s on the remote controller 24 can be operated to reproduce a content acquired from HDD 26 or the recording and reproduction apparatus 31 and to stop or temporarily stop the reproduction.

Furthermore, the backward skip key 24t and the forward skip key 24u on the remote controller 24 can be operated to perform what is called backward skipping and forward skipping in which the content being reproduced is skipped backward and forward, respectively, in a reproduction direction by a given amount.

Moreover, the fast backward key 24v, the fast forward key 24w, and the like on the remote controller 24 can be operated to perform what is called fast backward reproduction and fast forward reproduction in which the content being reproduced is continuously reproduced backward and forward, respectively, in the reproduction direction at a high speed.

Description will be given of a character input operation performed by the user using the software keyboard function in the above-described digital television broadcasting reception device 11. Here, the user needs to perform the character input operation, for example, upon requesting the digital television broadcasting reception device 11 to allow the user to perform what is called manual setting in which the user inputs and sets a string that can be optionally selected by the user.

Figure 3:
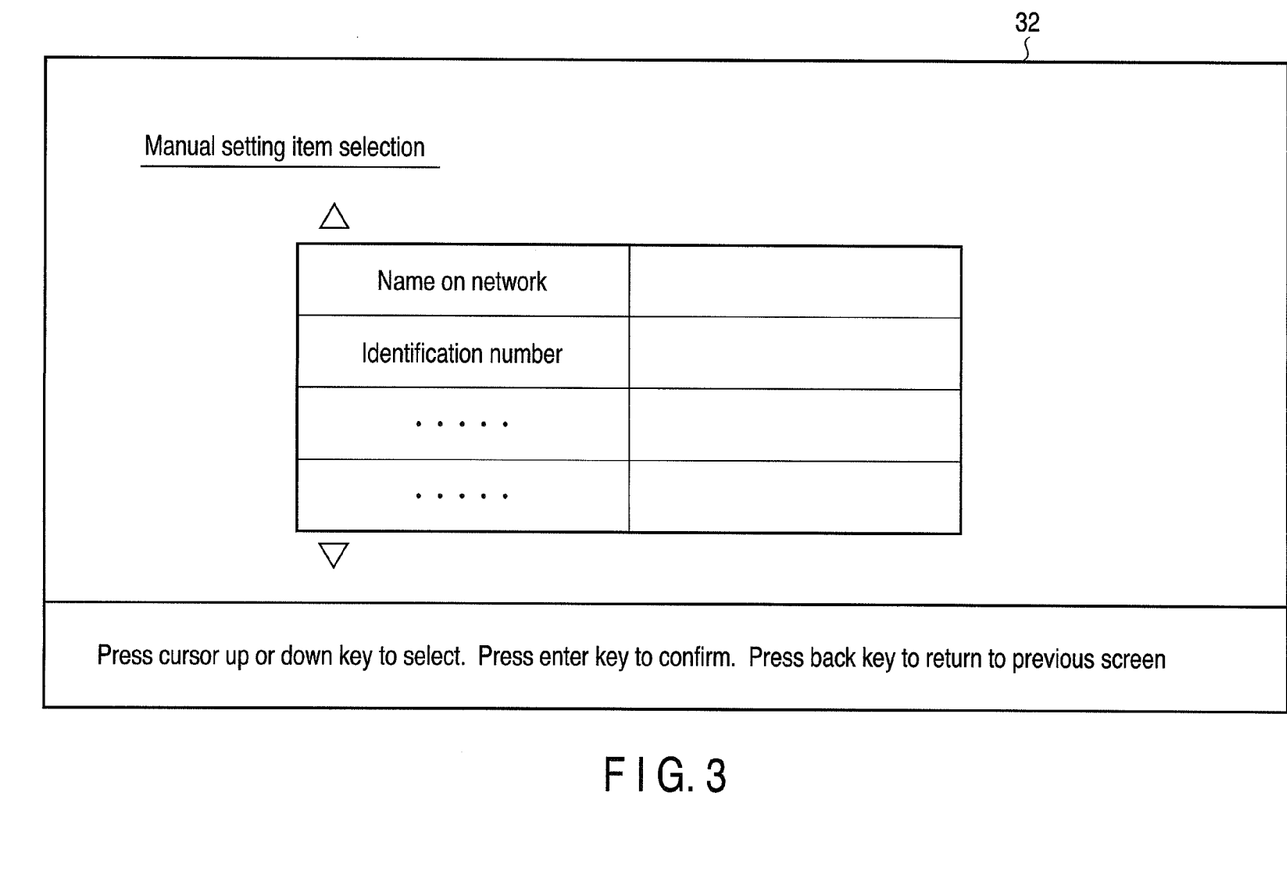
FIG. 3 is a diagram illustrating an example of a manual setting item selection screen displayed on the digital television broadcasting reception device according to the embodiment.

The request for the manual setting is started by the user by operating the menu key 24k on the remote controller 24 to enter a plurality of menu screens in a layered structure, thus displaying a manual setting item selection screen 32 on the screen of the video display section 19; an example of the manual setting item selection screen 32 is shown in FIG. 3.

The manual setting item selection screen 32 displays a name, an identification number, and the like for the digital television broadcasting reception device 11 which are used on the network 29 as well as various manual setting items. The user operates the cursor up or down key 24f or 24g on the remote controller 24 to select a desired item and then operates the enter key 24j. Then, a screen is displayed on which the user inputs characters for the selected item.

For example, it is assumed that while the manual setting item selection screen 32 shown in FIG. 3 is being displayed on the video display section 19, the user operates the cursor up or down key 24f or 24g on the remote controller 24 to select the item "Name on network", and then operates the enter key 24j.

Figure 4:
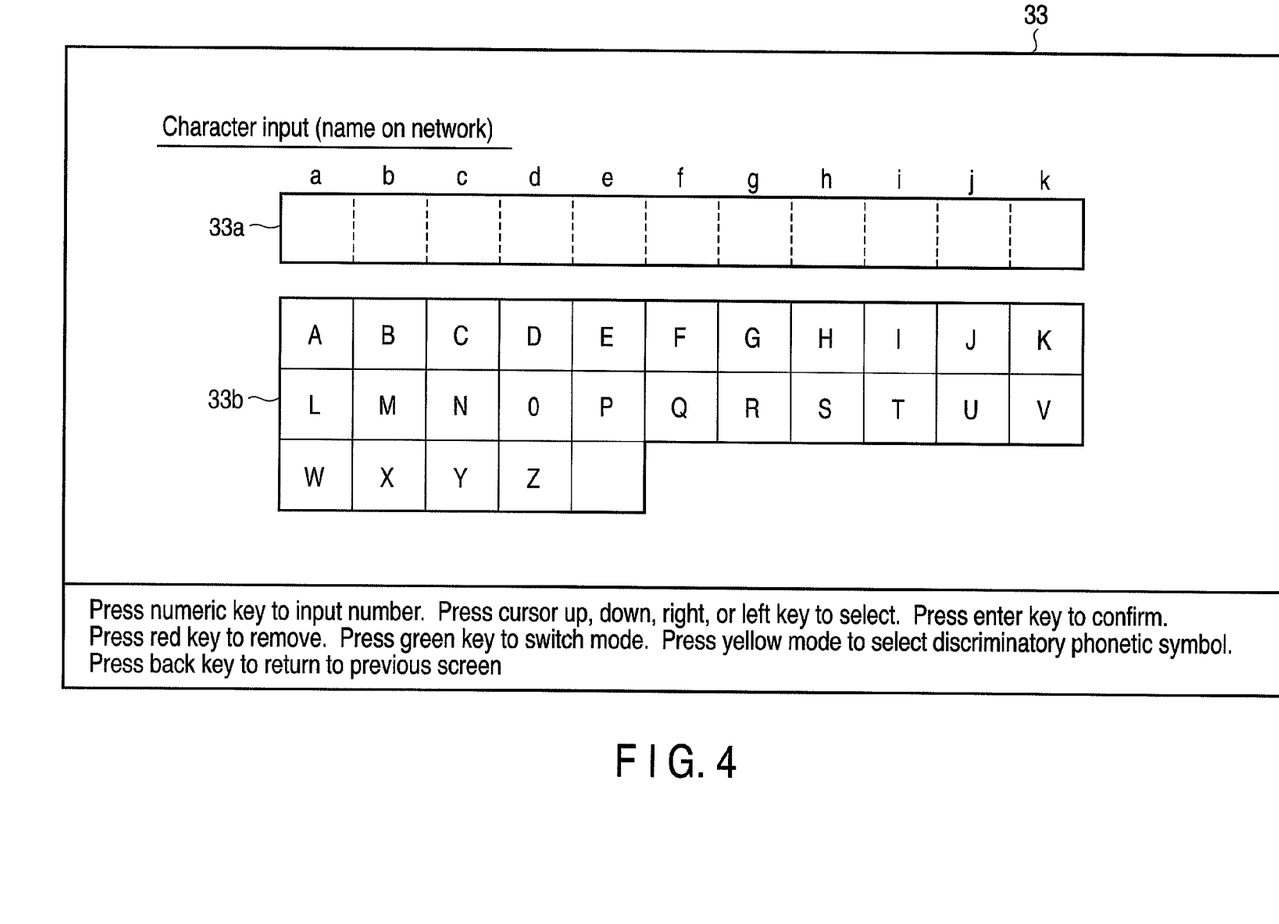
FIG. 4 is a diagram illustrating an example of a character input screen displayed on the digital television broadcasting reception device according to the embodiment.

Then, the character input processing section 22c of the control section 22 displays a character input (name on network) screen 33 on the video display section 19; an example of the character input screen is shown in FIG. 4. The character input (name on network) screen 33 shows an input character display section 33a in which characters input by the user are displayed, and a software keyboard section 33b in which 26 capital alphabetic characters "A" to "Z" are listed.

In the input character display section 33a, 11 input fields arranged on the screen in line in the horizontal direction and to each of which a number or an alphabetic character is input. In the description below, the leftmost input field is defined as the leading input field. The rightmost input field is defined as the trailing input field. The input fields are labeled as a, b, c, d, e, f, g, h, I, j, and k in this order from the leading input field to the trailing input field.

Furthermore, the software keyboard section 33b displays the 26 capital alphabetic characters "A" to "Z" in a list. The user operates any of the cursor up, down, right, and left keys 24f to 24i on the remote controller 24 to select the desired one of the alphabetic characters, and then operates the enter key 24j. Then, the selected alphabetic character is input to the input field in the input character display section 33a.

Specifically, it is assumed that with no number or alphabetic character placed in the input fields in the input character display section 33a as in, for example, the character input (name on network) screen 33 shown in FIG. 4, the user operates the "0" key of the numeric keys 24c on the remote controller 24 and then operates the enter key 24j. Then, as shown at reference character (a) in FIG. 5, the number "0" is input to the leading input field (a) in the input character display section 33a.

Then, it is assumed that the user operates the "1" key of the numeric keys 24c on the remote controller 24 and then operates the enter key 24j. Then, as shown at reference character (b) in FIG. 5, the number "1" is input to the input field (b), which is the leading input field in the input character display section 33a next to the input field (a), that is, which is located adjacent to the leading input field (a) in the input character display section 33a and closer to the trailing input field than the leading input field (a).

It is assumed that the user thereafter operates the "2" key of the numeric keys 24c on the remote controller 24 and then operates the enter key 24j. Then, as shown at reference character (c) in FIG. 5, the number "2" is input to the input field (c), which is located adjacent to the input field (b) in the input character display section 33a and closer to the trailing input field than the input field (b).

Moreover, it is assumed that the user thereafter operates the "3" key of the numeric keys 24c on the remote controller 24 and then operates the enter key 24j. Then, as shown at reference character (d) in FIG. 5, the number "3" is input to the input field (d), which is located adjacent to the input field (c) in the input character display section 33a and closer to the trailing input field than the input field (c).

It is assumed that the user operates any of the cursor up, down, right, and left keys 24f to 24i on the remote controller 24 to select the alphabetic character "A" from the software keyboard section 33b, and then operates the enter key 24j. Then, as shown at reference character (e) in FIG. 5, the alphabetic character "A" is input to the input field (e), which is located adjacent to the input field (d) in the input character display section 33a and closer to the trailing input field than the input field (d).

Figure 5:
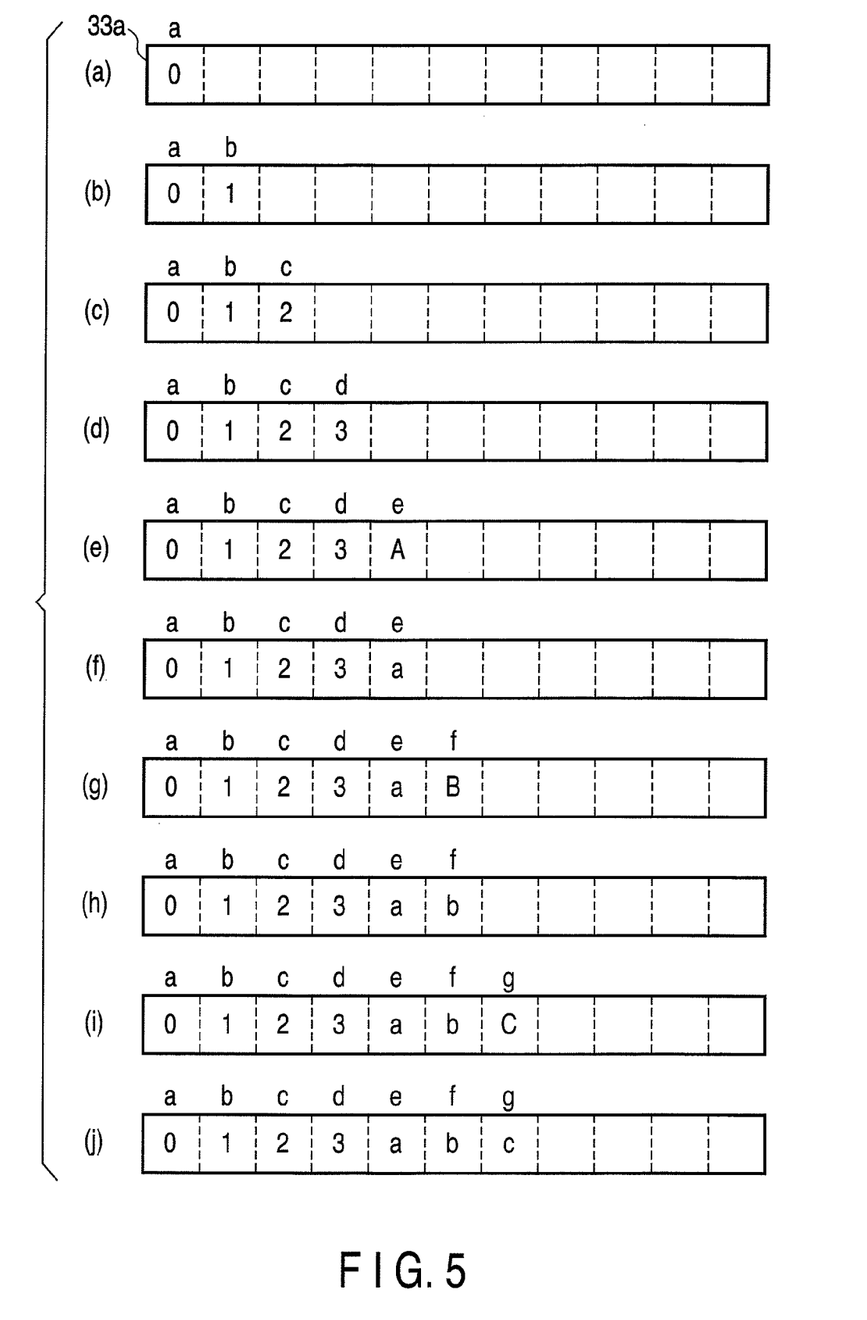
FIG. 5 is a diagram illustrating an example of a character input operation that uses a character input screen according to the embodiment.

In this state, when the user operates the green key 24p on the remote controller 24, then as shown at reference character (f) in FIG. 5, the capital alphabetic character "A" displayed in the input field (e) is converted into the lower case "a". Then, when the user operates the enter key 24j on the remote controller 24, the alphabetic character in the input field (e) is determined to be the lower case "a".

It is assumed that the user thereafter operates any of the cursor up, down, right, and left keys 24f to 24i on the remote controller 24 to select the alphabetic character "B" from the software keyboard section 33b, and then operates the enter key 24j. Then, as shown at reference character (g) in FIG. 5, the alphabetic character "B" is input to the input field (f), which is located adjacent to the input field (e) in the input character display section 33a and closer to the trailing input field than the input field (e).

In this state, when the user operates the green key 24p on the remote controller 24, then as shown at reference character (h) in FIG. 5, the capital alphabetic character "B" displayed in the input field (f) is converted into the lower case "b". Then, when the user operates the enter key 24j on the remote controller 24, the alphabetic character in the input field (f) is determined to be the lower case "b".

Moreover, It is assumed that the user operates any of the cursor up, down, right, and left keys 24f to 24i on the remote controller 24 to select the alphabetic character "C" from the software keyboard section 33b, and then operates the enter key 24j. Then, as shown at reference character (i) in FIG. 5, the alphabetic character "C" is input to the input field (g), which is located adjacent to the input field (f) in the input character display section 33a and closer to the trailing input field than the input field (f).

In this state, when the user operates the green key 24p on the remote controller 24, then as shown at reference character (j) in FIG. 5, the capital alphabetic character "C" displayed in the input field (g) is converted into the lower case "c". Then, when the user operates the enter key 24j on the remote controller 24, the alphabetic character in the input field (g) is determined to be the lower case "c".

When with a string of the numbers and alphabetic characters "0123abc" (which corresponds to the name of the digital television broadcasting reception device 11 on the network 29) placed in the input fields (a) to (g) in the input character display section 33a, the user operates the back key 24l on the remote controller 24, the display returns to the manual setting item selection screen 32.

Figure 6:
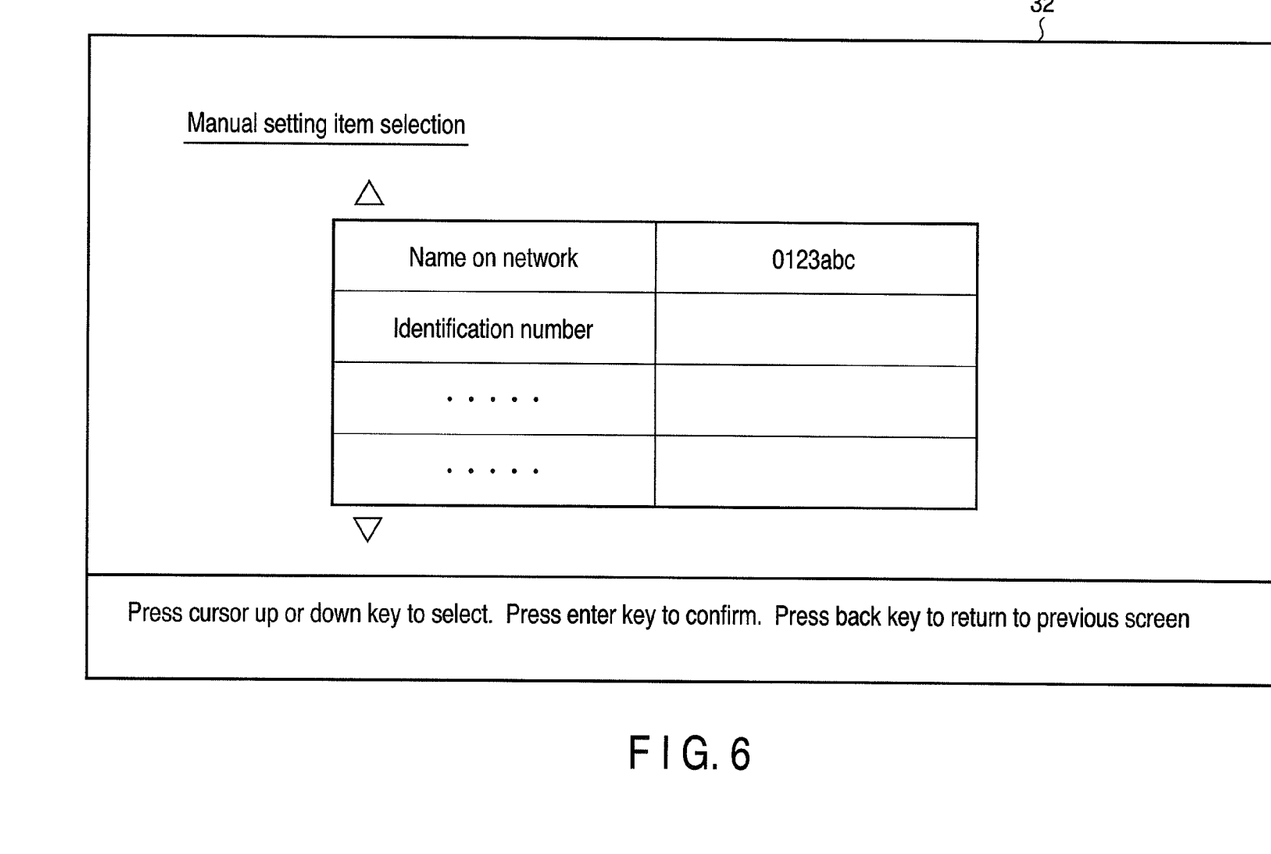
FIG. 6 is a diagram illustrating an example of the manual setting item selection screen displayed after a character input operation that uses the character input screen according to the embodiment.

FIG. 6 shows the manual setting item selection screen with the name of the digital television broadcasting reception device 11 on the network 29 input. In this case, the previously input "0123abc" is displayed in the "name on network" section of the manual setting item selection screen 32 as the name of the digital television broadcasting reception device 11 on the network 29.

Here, like reference character (e) in FIG. 5 described above, reference character (a) in FIG. 7 indicates that the user has operated any of the cursor up, down, right, and left keys 24f to 24i on the remote controller 24 to select the alphabetic character "A" from the software keyboard section 33b and then operated the enter key 24j to input the capital alphabetic character "A" to the input field (e) in the input character display section 33a.

Figure 7:
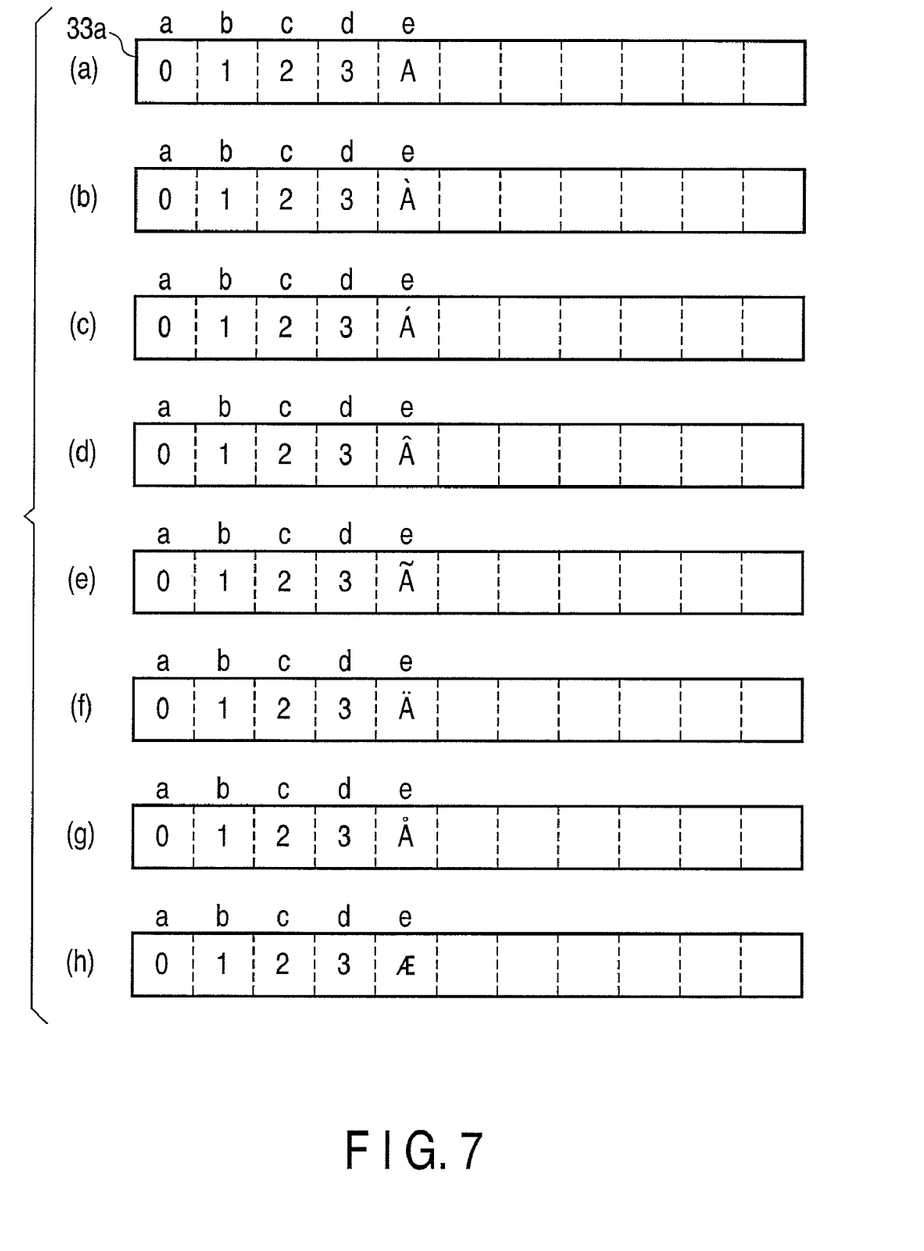
FIG. 7 is a diagram illustrating an example of an operation of inputting a grapheme using the character input screen according to the embodiment.

When with the capital alphabetic character "A" placed in the input field (e) in the input character display section 33a, the user operates the yellow key 24q on the remote controller 24, then in response to every operation, seven graphemes are sequentially and selectively switched and displayed in the input field (e) as shown at reference characters (b), (c), (d), (e), (f), (g), and (h) in FIG. 7.

If the state shown at reference character (h) in FIG. 7 is reached and the user operates the yellow key 24*q* on the remote controller 24, the display returns to the capital alphabetic character "A" a shown at reference character (a) in FIG. 7. That is, with the capital alphabetic character "a" placed in the input field (e) in the input character display section 33*a*, every time the user operates the yellow key 24*q* on the remote controller 24, the character displayed in the input field (e) is cyclically switched as follows.

A→À→Á→Â→Ã→Ä→Å→Æ→A

Thus, upon operating the yellow key 24*q* on the remote controller 24 to display, in the input field (e), the capital alphabetic character "A" or a character corresponding to one of the seven graphemes present for the capital alphabetic character "A" which is to be input, the user can operate the enter key 24*j* to input the character to the input field (e).

According to the above-described embodiment, every time the yellow key 24*q* on the remote controller 24 is operated after the particular alphabetic character (in this case, "A") selected from the software keyboard section 33*b* has been input to the input field (e) in the input character display section 33*a*, the graphemes present for the input alphabetic character are sequentially switched and displayed.

When the desired character is displayed in the input field (e), the character can be input to the input field (e) by operating the enter key 24*j*. Thus, when characters are input using the software keyboard section 33*b*, the graphemes for the Roman alphabet can be easily input. This makes the input operation more convenient for the user and preferable for practical use.

Furthermore, in the above-described embodiment, a plurality of graphemes present for a particular capital alphabetic character are sequentially switched and displayed. However, for example, as shown at reference numeral (f) in FIG. 5, when the lower-case alphabetic character "a" is input to the input field (e) in the input character display section 33*a*, every time the yellow key 24*q* on the remote controller 24 is operated, the plurality of graphemes present for the lower-case alphabetic character "a" are sequentially and selectively switched and displayed in the input field (e). Then, when the desired character is displayed in the input field (e), the enter key 24*j* can be operated to input the character to the input field (e).

If for example, as shown at reference character (g) in FIG. 5, a character with no grapheme is input as in the case where the capital alphabetic character "B" is input to the input field (f) in the input character display section 33*a*, no response is made even with operation of the yellow key 24*q* on the remote controller 24, with the capital alphabetic character "B" still displayed in the input field (f) in the input character display section 33*a*.

Naturally, the situation remains unchanged even if for example, as shown at reference character (h) in FIG. 5, the lower-case alphabetic character "b" is input to the input field (f) in the input character display section 33*a*. That is, since the lower-case alphabetic character "b" also has no grapheme, no response is made even with operation of the yellow key 24*q* on the remote controller 24, with the lower-case alphabetic character "b" still displayed in the input field (f) in the input character display section 33*a*.

Figure 8:
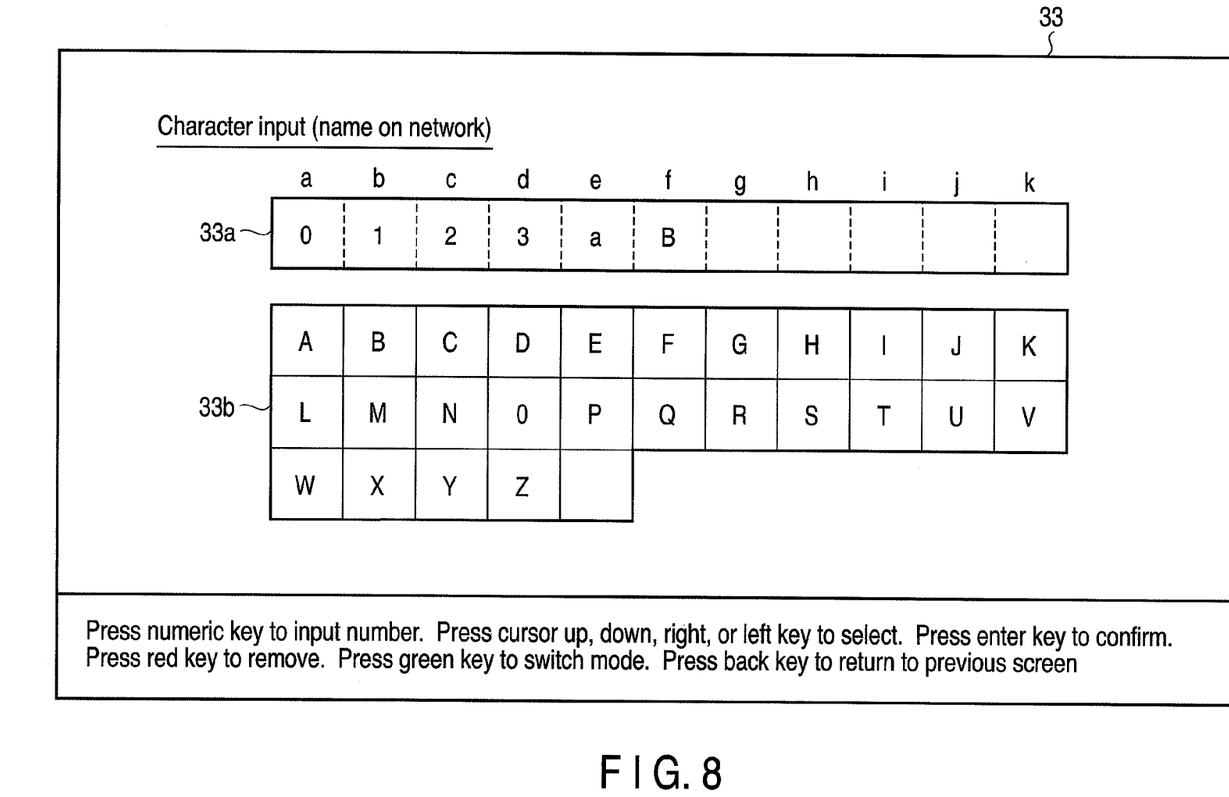
FIG. 8 is a diagram illustrating an example of the character input screen displayed when a character with no grapheme is input.

Furthermore, FIG. 8 shows an example of the character input (name on network) screen 33 displayed when a character with no grapheme like the capital alphabetic character "B" is input to the input field (f) in the input character display section 33*a*. That is, the character input processing section 22*c* removes an operation guide for the yellow key 24*q* from the operation guides for the respective keys displayed at the bottom of the character input (name on screen) screen 33.

Figure 9:
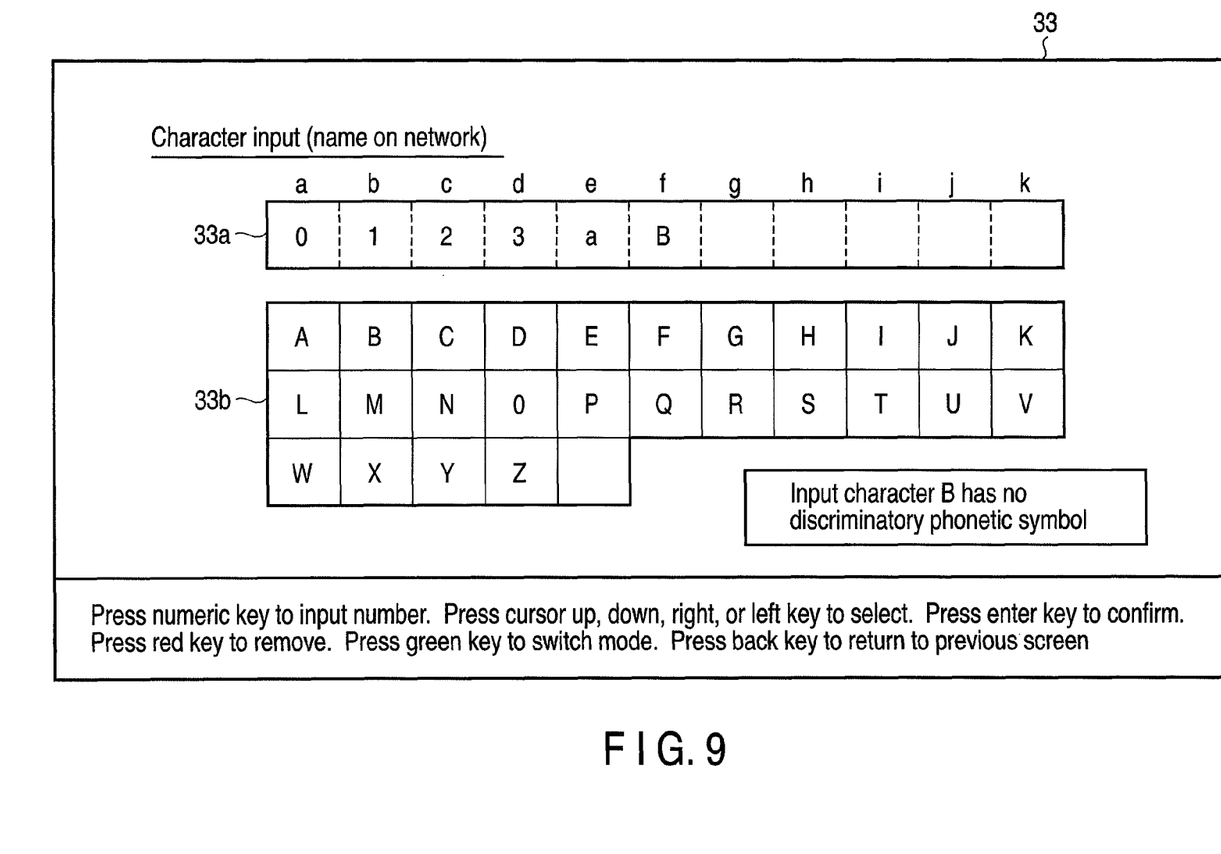
FIG. 9 is a diagram illustrating another example of the character input screen displayed when a character with no grapheme is input.

Moreover, FIG. 9 shows another example of the character input (name on network) screen 33 displayed when a character with no grapheme like the capital alphabetic character "B" is input to the input field (f) in the input character display section 33*a*. That is, the character input processing section 22*c* sets a message display section 33*c* in the character input (name on network) screen 33 and displays the message "input character B has no grapheme" in the message display section 33*c*. The character input processing section 22*c* thus warns the user that switching to graphemes is impossible.

Furthermore, in the above-described embodiment, for a particular alphabetic character (in this case, "A") selected from the software keyboard section 33*b* and input to the input field (e) in the input character display section 33*a*, graphemes present for the input alphabetic character are sequentially switched ad displayed in response to every operation of the yellow key 24*q* on the remote controller 24.

However, the present embodiment is not limited to the above-described configuration. That is, even if the user only operates any of the cursor up, down, right, and left keys 24*f* to 24*i* on the remote controller 24 to select a particular alphabetic character (in this case, "A") from the software keyboard section 33*b*, namely, even if the user fails to operate the enter key 24*j* and the selected particular alphabetic character has not been input to the input field (e) in the input character display section 33*a* yet, the following operation may be enabled. The user operates the yellow key 24*q* on the remote controller 24 to display the capital alphabetic character "A" in the input field (e) in the input character display section 33*a* as shown at reference character (a) in FIG. 7. Thereafter, every time the user operates the yellow key 24*q* on the remote controller 24, the seven characters with the graphemes present for the capital alphabetic character "A" are sequentially and selectively switched and displayed as shown at reference characters (b), (c), (d), (e), (f), (g), and (h).

Moreover, the following operation may be possible. On the character input (name on network) screen 33, the user operates any of the cursor up, down, right, and left keys 24*f* to 24*i* on the remote controller 24 to select one of the input fields (a) to (k) in the input character section 33*a*. Then, every time the user operates the yellow key 24*q* on the remote controller 24, graphemes for the character input to the selected one of the input fields (a) to (k) are sequentially and selectively switched and displayed. Then, when the desired character is displayed in the selected one of the input fields (a) to (k), the user operates the enter key 24*j* to input the character to the selected one of the input fields (a) to (k).

Now, another example in which any of the graphemes present for an input particular alphabetic character is selected will be described. As previously shown at reference numeral (e) in FIG. 5, the user operates any of the cursor up, down, right, and left keys 24*f* to 24*i* on the remote controller 24 to select the alphabetic character "A" from the software keyboard section 33*b* and then operates the enter key 24*j* to input the capital alphabetic character "A" to the input field (e) in the input character display section 33*a*. Then, with the capital alphabetic character "A" placed in the input field (e) in the input character display section 33*a*, the user operates the yellow key 24*q* on the remote controller 24.

Figure 10:
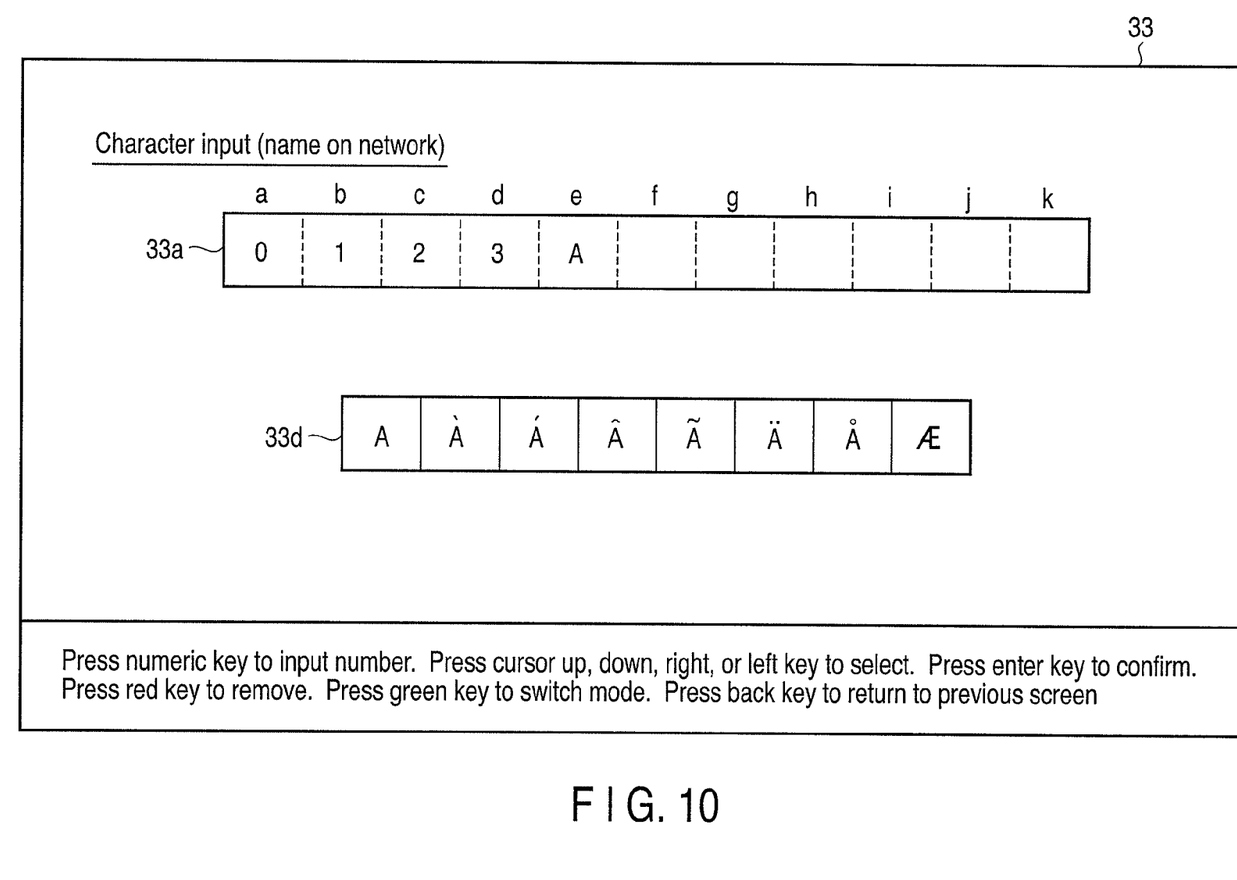
FIG. 10 is a diagram illustrating another example of a character input operation that uses the character input screen according to the embodiment.

Then, as shown in FIG. 10, the character input processing section 22*c* displays a selection display section 33*d* that displays, instead of the software keyboard section 33*b*, the capital alphabetic character "A" and the seven graphemes present for the capital alphabetic character "A", in a list. In FIG. 10, on the screen, the selection display section 33*d* is shown as a line arranged in the horizontal direction.

Then, the user operates any of the cursor up, down, right, and left keys 24*f* to 24*i* on the remote controller 24 to select the desired one of the characters listed in the selection display section 33*d*. The user then operates the enter key 24*j* to input the selected character to the input field (e) in the input character display section 33*a*.

As described above, in the character input operation that uses the software keyboard section 33*b*, graphemes in the Roman alphabet can also be easily input by the following technique. The selection display section 33*d* is displayed which displays, in a list, a particular alphabetic character and graphemes present for the particular alphabetic character. Then, the desired character is selected from the selection display section 33*d* and then input. This technique makes the input operation more convenient for the user and preferable for practical use. In this case, the particular alphabetic character (in this case, "A") already placed in the input field (e) in the input character display section 33*a* need not be contained in the selection display section 33*d*.

Furthermore, in the example shown in FIG. 10, for the particular alphabetic character (in this case "A") selected from the software keyboard section 33*b* and input to the input field (e) in the input character display section 33*a*, the yellow key 24*q* on the remote controller 24 is operated to display the input alphabetic character and the graphemes present for the alphabetic character, in the selection display section 33*d* in a list.

However, the present embodiment is not limited to the above-described configuration. That is, even if the user only operates any of the cursor up, down, right, and left keys 24*f* to 24*i* on the remote controller 24 to select a particular alphabetic character (in this case, "A") from the software keyboard section 33*b*, namely, even if the user fails to operate the enter key 24*j* and the selected particular alphabetic character has not been input to the input field (e) in the input character display section 33*a* yet, the following operation may be enabled. The user operates the yellow key 24*q* on the remote controller 24 to display the input alphabetic character and the graphemes present for the alphabetic character in the selection display section 33*d* in a list. In this case, the particular alphabetic character (in this case, "A") selected from the software keyboard section 33*b* by the user by operating any of the cursor up, down, right, and left keys 24*f* to 24*i* on the remote controller 24 needs to be contained in the selection display section 33*d*.

As described above, even in the technique for displaying, in a list, graphemes present for a particular alphabetic character selected from the software keyboard section 33*b* or input to one of the input fields (a) to (k) in the input character display section 33*a*, when a character with no grapheme is selected or input, the following takes place. When the yellow key 24*q* on the remote controller 24 is operated, the selection display section 33*d* displays only the selected or input character with no grapheme. That is, only the one character can be selected from the selection display section 33*d*. Furthermore, in this case, as shown in FIG. 8 or 9, the operation guide for the yellow key 24*q* can be removed or a message can be displayed.

Furthermore, in the embodiment, the digital television broadcasting reception device 11 has been described. However, the embodiment is not limited to this aspect but is of course widely applicable to, for example, a digital broadcasting reception apparatus such as a set-top box (STB) or a recording and reproduction apparatus that uses an optical disk such as Digital Versatile Disk (DVD).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A character input device comprising:
    an input module configured to display a plurality of alphabetic characters on a screen and to select and input any of the plurality of alphabetic characters on the screen to an input field, based on a key operation on a remote controller; and
    a controller configured to sequentially and selectively display a plurality of alphabetic characters associated with the alphabetic characters input to the input field by the input module, at positions where the alphabetic characters are input, every time a first key on the remote controller is operated, and to input the alphabetic character displayed in the input field when a second key on the remote controller is operated,
    wherein the controller is configured such that if an alphabetic character input to the input field by the input module has no alphabetic character associated therewith, the controller displays a warning to that effect on the screen.

2. The character input device of claim 1, wherein the controller is configured to disregard an operation of the first key on the remote controller if an alphabetic character input to the input field by the input module has no alphabetic character associated therewith.

3. The character input device of claim 1, wherein the controller is configured to remove an operation guide for the first key on the remote controller from the screen if an alphabetic character input to the input field by the input module has no alphabetic character associated therewith.

4. A character input method comprising:
    displaying a plurality of alphabetic characters on a screen based on a key operation on a remote controller; selecting and inputting any of the plurality of alphabetic characters on the screen to an input field;
    sequentially and selectively displaying a plurality of alphabetic characters associated with an alphabetic character input to the input field by the input module, at positions where the alphabetic characters are input, every time a first key on the remote controller is operated, and inputting the alphabetic character displayed in the input field when a second key on the remote controller is operated; and
    if an alphabetic character input to the input field by the input module has no alphabetic character associated therewith, displaying a warning to that effect on the screen.

\* \* \* \* \*